United States Patent [19]

Locey

[11] Patent Number: 5,087,511

[45] Date of Patent: Feb. 11, 1992

[54] COMPOSITE ELEMENT HAVING A VARIABLE DENSITY CORE

[75] Inventor: Bryan A. Locey, Hamilton, Ohio

[73] Assignee: General Electric Company, Cincinnati, Ohio

[21] Appl. No.: 575,763

[22] Filed: Aug. 31, 1990

[51] Int. Cl.⁵ .............................................. B32B 7/02
[52] U.S. Cl. ................................. 428/218; 428/310.5; 428/319.3
[58] Field of Search ................. 428/218, 304.4, 310.5, 428/319.3, 319.7

[56] References Cited

U.S. PATENT DOCUMENTS

| | | | |
|---|---|---|---|
| 3,925,526 | 12/1975 | Haas | 428/310.5 |
| 4,463,049 | 7/1984 | Kracke | 428/310.5 |
| 4,584,230 | 4/1986 | Saegusa | 428/218 |

Primary Examiner—William J. Van Balen
Attorney, Agent, or Firm—Jerome C. Squillaro; Carmen Santa Maria

[57] ABSTRACT

A composite element having a core and two face sheets attached to respective faces of the core. The core density varies along its length and, in turn, varies the element strength along its length. The core can include either a ceramic material or a urethane foam. The face sheet can include metals, a fiber reinforced polymeric material or a polymer matrix composite material. The element can take the shape of a beam, plate or shell and can be used in high pressure and high temperature applications. The composite element is particularly suited for aerospace applications.

25 Claims, 4 Drawing Sheets

COMPOSITE ELEMENT HAVING A VARIABLE DENSITY CORE

FIELD OF THE INVENTION

This invention relates generally to structural elements and, more particularly, to an element subjected to specific load conditions.

DESCRIPTION OF THE PRIOR ART

Composite structural elements made in the form of beams, plates and shells are used in a wide variety of structures, from buildings to airplanes. These composite elements typically include an inner core material and a monolithic skin surrounding the material and enable a structural engineer to tailor the composite element to have specific properties. Some examples of these elements can be found in the aircraft industry where an airplane wing may have a honeycomb core and aluminum skin; in the acoustic industry where the elements have specific audio characteristics; in the construction industry where the elements have an insulation core and a monolithic skin, such as drywall attached thereto; and in the furnace industry where an element may have a ceramic core and steel skin. It is known that for a given core material, for example, a ceramic, that the core density directly affects the strength of the element. U.S. Pat. Nos. 4,539,252; 4,355,754; 3,864,444; 3,816,233; 3,066,059 and 2,866,730 disclose elements in which the core density is varied across the core thickness.

The aerospace industry has particularly shown great interest in composite elements as a source of eliminating excess weight from airplanes, since by decreasing an airplane's weight, the airplane can transport an increased payload and become more fuel efficient. A particular area of the airplane which adds appreciably to its overall weight are the engines. The engines require structural elements which are subjected to both high temperatures and high pressures. These elements generally include a composite having a core which can withstand high temperature and pressure gradients. Further, these elements generally are in the form of plates and beams which are attached along their edges to a structural frame. Under the above conditions, these elements exhibit shear stresses and shear forces which are much greater than the normal bending stresses, and, thus, when one of these elements fails, it is due to the shear stresses. Further, the shear stresses are greatest at the attached edges and vary along the length of the element in such a manner that the shear stresses are lowest in a middle portion of the element.

Present structural elements have consistent mechanical properties along their lengths even though there may be a significant variation in mechanical property requirements across the element width. This can result in an over-designed and needlessly heavy element as in the case of the above-described engine element where the element needs only the high shear strength properties about the element edges.

Therefore, it is an object of the present invention to provide a lighter structural composite element without sacrificing required strength in specific areas.

SUMMARY OF THE INVENTION

The present invention is a composite element including a core having two faces and having a length extending along a longitudinal axis and a thickness extending along a transverse axis perpendicular to the longitudinal axis. The core has a density which varies with respect to the longitudinal axis. Two face sheets are attached to the respective core material faces. The core can have a constant density across the thickness and can be a ceramic material or a urethane material. The face sheets can include metal or a polymer matrix composite in which resin matrix material can be selected from the group consisting of epoxies, polyimides, polyesters and urethanes, and the fiber components can be selected from the group consisting of aramid fibers, glass fibers, carbon fibers and polyester fibers. Preferably, the core length should be substantially greater than the core thickness and the thickness of each face sheet should be substantially less than the core's thickness. The element can be a beam, a plate or a shell.

The element can be adapted to mount on a support structure where the core has a first end section and a second end section positioned along the longitudinal axis for mounting to the support structure. A middle section of the core is positioned between the ends. The core density varies along the core length and is greatest at the ends and is least at the middle section. The core density can continuously decrease from the first end to the middle section and continuously increase from the middle section to the second end.

The composite element can also be a high temperature composite element wherein one of the faces is subjected to pressures substantially greater than the other face.

The composite element can also be a shell for mounting on a support structure including a shell-like core having two faces and having a length extending along a longitudinal axis and a thickness. The core density varies along the circumference of the core. Two face sheets mount to respective faces of the core. The composite element can be cylindrical in shape. Further, the core density can also vary along the core length.

BRIEF DESCRIPTION OF THE PREFERRED EMBODIMENTS

Figure 1:
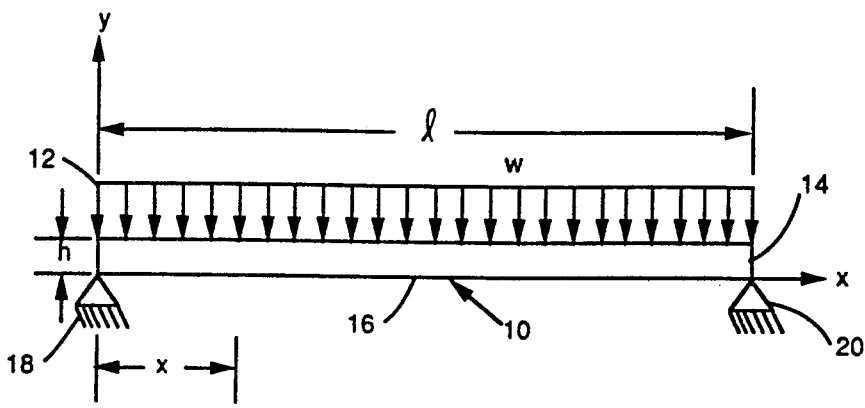
FIG. 1 shows a side view of a beam simply supported and under a uniform pressure load.

FIG. 1 shows a simply supported composite element or beam 10 having a length l and a thickness h where the length is substantially greater than the thickness of the beam 10. The length of the beam 10 extends along a longitudinal axis x and the thickness extends along a transverse axis y perpendicular to the longitudinal axis. The beam 10 is subjected to a uniform load w lb/ft along its length which acts perpendicular to the beam's longitudinal axis. The beam 10 includes a first end 12, a second end 14 and a middle section 16 positioned equidistant from the ends 12, 14. End support structures 18, 20 simply support the beam 10 at ends 12, 14, respectively.

The term "simply supported" means that the end supports are capable of exerting only forces upon the beam and are not capable of exerting any moments. Thus, there is no restraint offered to the angular rotation of the ends of the beam at the supports as the beam deflects under the loads. At least one of the supports must be capable of undergoing horizontal movement so that no force will exist in the direction of the axis of the beam. The beam 10 subjected to uniform load w is a good representation of the structural elements used on airplanes, especially those dealing with the engines.

Under the uniform loading condition, the shear force reactions at ends 12, 14 are equal to wl/2. The shear force and bending moment of the beam at any section a distance x from end 12 can be determined from the following relationships:

$$V_x = \frac{wl}{2} - wx,$$

$$M_x = \frac{wlx}{2} - \frac{wx^2}{2}$$

where:
$V_x$ is the shear force;
x is the longitudinal distance from end 12; and
$M_x$ is the bending moment.

*Elements of Strength of Materials*, Timoshenko & Young, 5th Edition, pg. 106.

Figure 4:
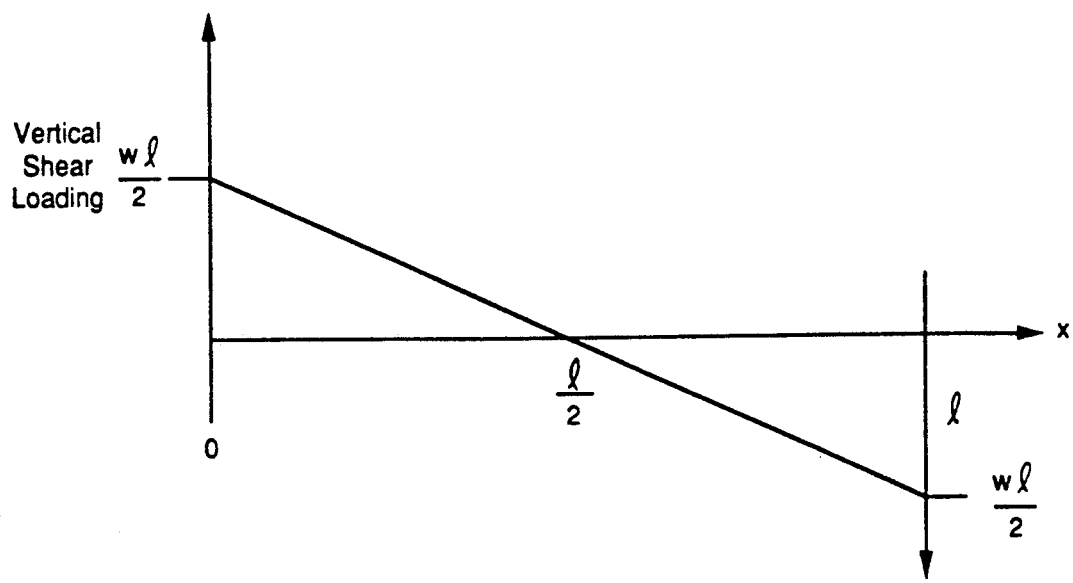
FIG. 4 is a graphic representation of the shear force loading of the beam of FIG. 1 as a function of the beam's longitudinal length.

FIG. 4 shows a graphic representation of the shear force of the beam 12 subjected to the uniform load w as a function of the beam length l. It is clear from both the shear force equation and FIG. 4 that $V_x$ varies linearly with respect to x.

It is important in designing structural elements for the aerospace industry that the structural elements not be subjected to forces which can cause plastic deformation or failure to the element. For a simply supported beam having a rectangular cross-section with a thickness h and subjected to a uniform distributed transverse loading, the normal stress $\sigma_x$ and the shear stress ($\tau_{xy}$) can be calculated at any distance y from the neutral axis of the beam, as follows:

$$\sigma_x = \frac{M_x y}{I}$$

$$\tau_{xy} = \frac{V_x}{2I}\left(\frac{h^2}{4} - y^2\right)$$

where I is the moment of inertia of the cross-section area with respect to the beam neutral. *Elements of Strength of Materials*, Timoshenko & Young, 5th Edition, pg. 179.

Generally, the structural elements of airplane engines fail because of high shear stresses as opposed to bending stresses. As can be seen from the above equations and FIG. 4, the highest shear forces occur at or near the ends 12, 14 of the simply supported beam under a uniform load w and the least shear forces occur in the middle section 16 of the beam 10. Presently, the structural elements are designed to withstand the highest shear forces throughout the entire length of the beam.

Figure 2:
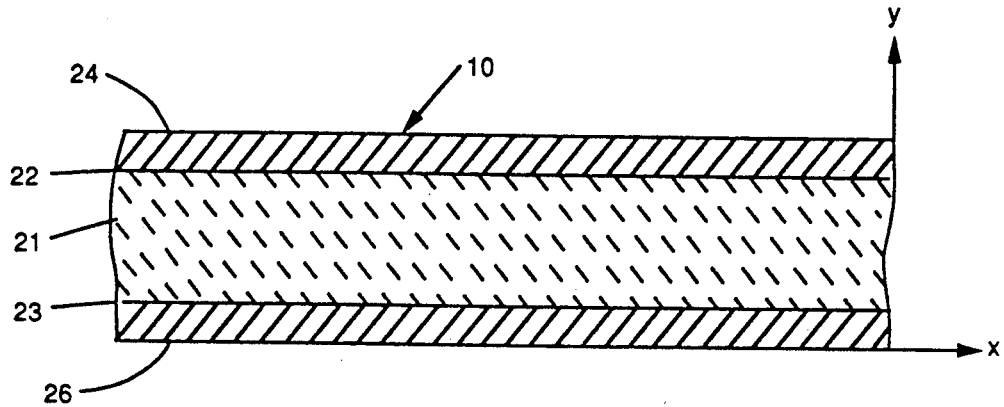
FIG. 2 shows a cross-section of a composite element having uniform density with respect to the longitudinal axis.
Figure 5:
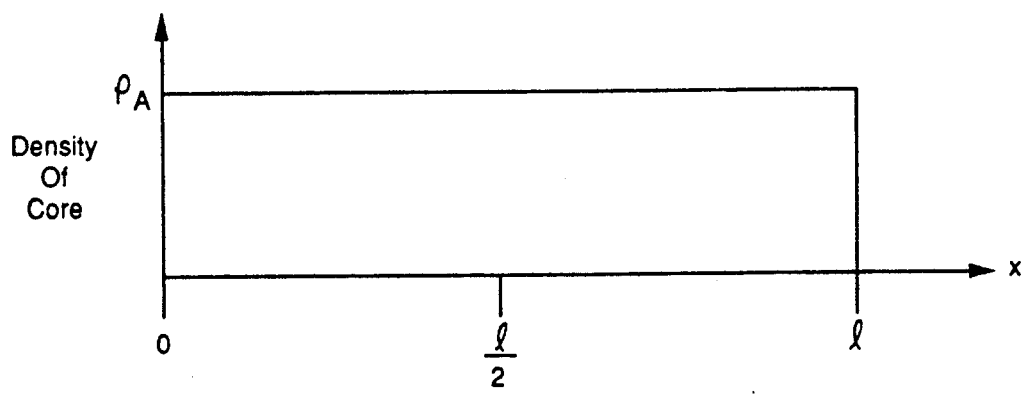
FIG. 5 is a graphic representation of the core density with respect to the length of the beam of FIG. 2.
Figure 8:
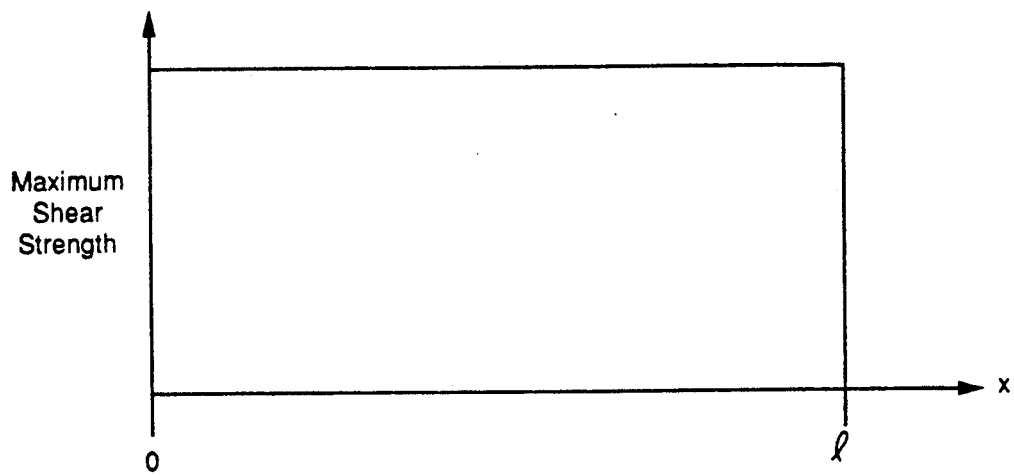
FIG. 8 is a graphic representation of the maximum shear strength of a beam having a constant density core with respect to the beam's length.
Figure 9:
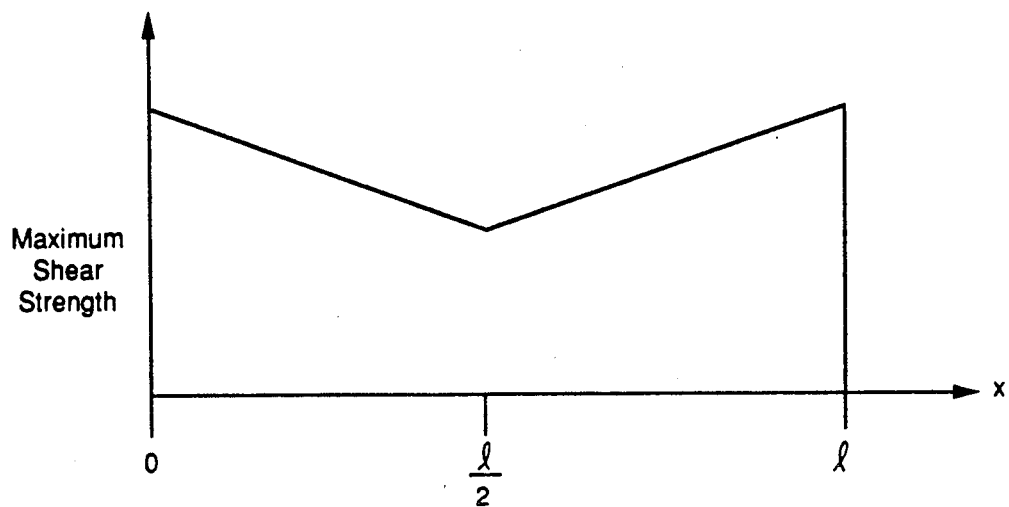
FIG. 9 is a graphic representation of the maximum shear strength of a beam made in accordance with the present invention with respect to the beam's length.

Heretofore, composite structural elements used for aerospace applications included a core 21 having two faces 22, 23 and two face sheets 24, 26 attached to respective core faces, as shown in FIG. 2. This element 10 can also be representative of a high temperature composite element where one of the faces is subjected to pressures substantially greater than the other face. The core's length extends along the longitudinal axis x and the core's thickness extends along the transverse axis y perpendicular to the longitudinal axis x. Cores have been made of ceramics, urethanes or honeycomb structures and the face sheets can be metal such as aluminum or steel, which are well known in the art. The strength of the core material is directly related to the core density ($\rho$), hence, the denser the core, the stronger it is. Further, under present designs, the core density has been constant ($\rho_a$) across the core length as graphically represented in FIG. 5. This results in a beam which can support the high shear forces present at the beam ends 12, 14 over its entire length, as graphically shown in FIG. 8, even though only a small percentage of the beam is subjected to those forces. In turn, the beam is heavier than necessary due to the constant core density across the length of the beam 10.

Figure 3:
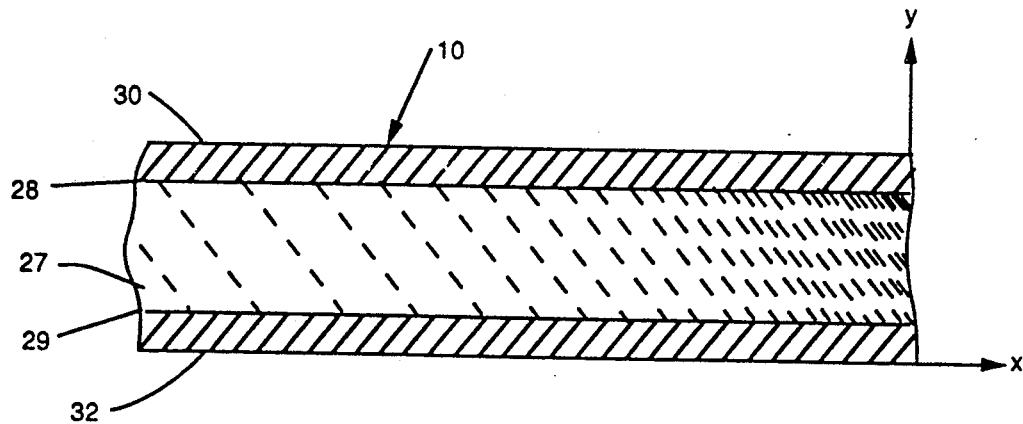
FIG. 3 shows a cross-section of a composite element having a variable density with respect to the longitudinal axis.
Figure 6:
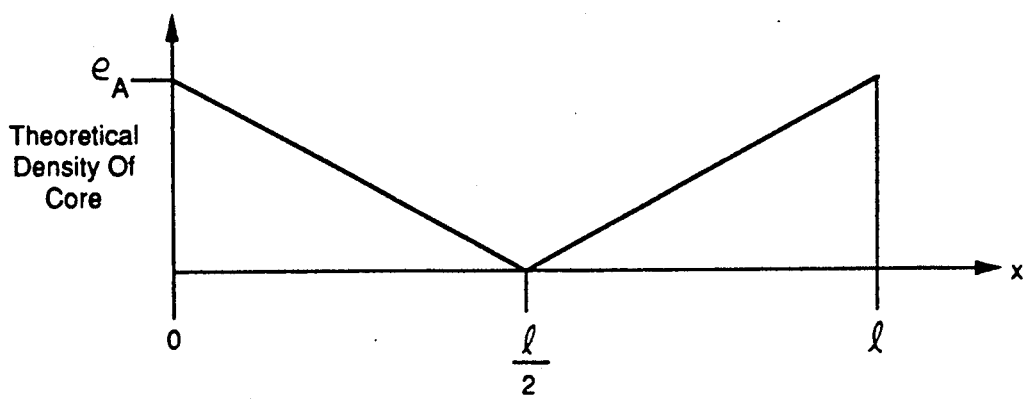
FIG. 6 is a graphic representation of the theoretical core density with respect to a beam's length of a beam made in accordance with the present invention.
Figure 7:
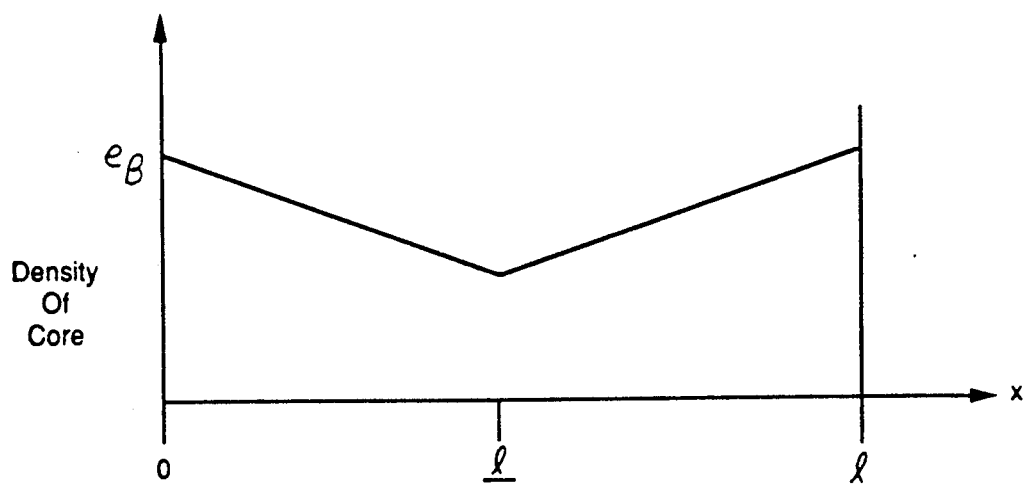
FIG. 7 is a graphic representation of the core density with respect to the beam's length of a beam made in accordance with the present invention.

FIG. 3 shows a preferred embodiment of the composite structural element or beam 10 made in accordance with the present invention. The beam 10 includes a core material 27 having two faces 28, 29 and two face sheets 30, 32. The core's length extends along the longitudinal axis x and the core's thickness extends along the transverse axis y. The core's density varies along the length of core 27 and can be constant across the width of core 27. The length of the core 27 is substantially greater than its thickness, on the order of 10 or more times greater, and the thickness of the core 27 is substantially greater than the thickness of the face sheets 30, 32. FIG. 6 shows a graphic representation of the theoretical density of the core 27 with respect to the length of beam 10 subjected to the loading conditions shown in FIG. 1. The theoretical density of the core 27 along the length of the core is directly related to the shear forces existing along the length of the beam 10, and the density ($\rho_a$) is greatest at the beam ends 12, 14, and the density is least, zero, at the middle section 16. This results in a substantially lighter beam as is evident when comparing FIGS. 5 and 6. However, in actual practice, various safety factors and the normal bending stresses must also be taken in consideration in design of the beam 10 and, therefore, the actual core densities would be greater than that shown in FIG. 6. FIG. 7 is a graphic representation of the actual density of core 27 along the length of the beam 10 subjected to the loading conditions shown in FIG. 1. The density of core 27 varies along the beam length, continually-lineally decreasing from the beam end 12 to the middle section 16 and continually-lineally increasing linearly in value from the middle section 16 to end 14, as shown in FIG. 7. It is believed that a beam made in accordance with the present invention will be approximately 30-35% lighter than that of a conventional beam having the same core material.

The actual core density can vary depending on whether the beam has fixed ends or simply supported ends and the load conditions. Further, the present invention applies also to plate composites and shell composites having variable density cores. Classical stress analysis or finite element stress analysis, which are well known in the art, can be used to determine the proper variable core densities required. The present invention is, likewise, applicable to plates and shells, such as tubular cylindrical structural members.

Figure 10:
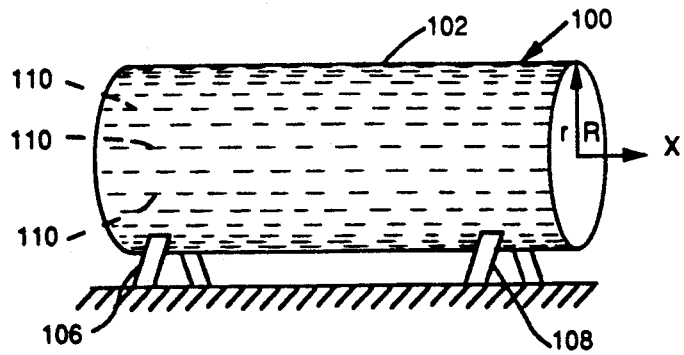
FIG. 10 shows a side view of a cylindrical tank resting on supports and subjected to an internal distributed load.
Figure 11:
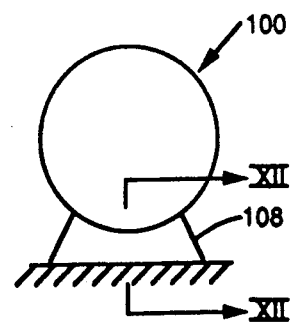
FIG. 11 is a side view of the cylindrical tank of FIG. 10.
Figure 12:
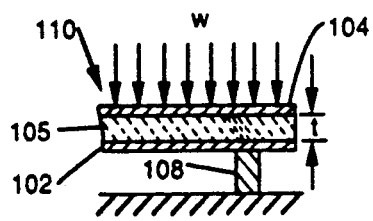
FIG. 12 is a section along line XII—XII of FIG. 11.

FIGS. 10-12 show a second embodiment of the present invention, a cylindrical tank or shell 100 having a length substantially greater than the tank thickness (t) which is subjected to an internal unit pressure w. The tank 100 has an outer face sheet 102, an inner face sheet 104, both of which are attached to a shell-like variable density cylindrical core material 105 similar to that shown in FIG. 3. Two supports 106 and 108 mount to the outer face sheet 102 and support the tank 100 on the ground 110. This arrangement is representative of a shroud assembly for an airplane engine which encases rotating blades.

The tank 100 is subjected to three stresses: meridional stresses ($\sigma_1$) (stresses in the longitudinal direction), hoop stress ($\sigma_2$) (stresses in the circumferential section) and radial stresses ($\sigma_3$) (analogous to shear stresses of the beam). The hoop stress can be calculated as follows:

$$\sigma_2 = \frac{wR}{t}$$

where:
$\sigma_2$ = hoop stress
w = unit pressure
R = radius at curvature of a circumference of the tank
t = the tank thickness
where the length of the tank 100 and R are substantially greater than t.

Figure 13:
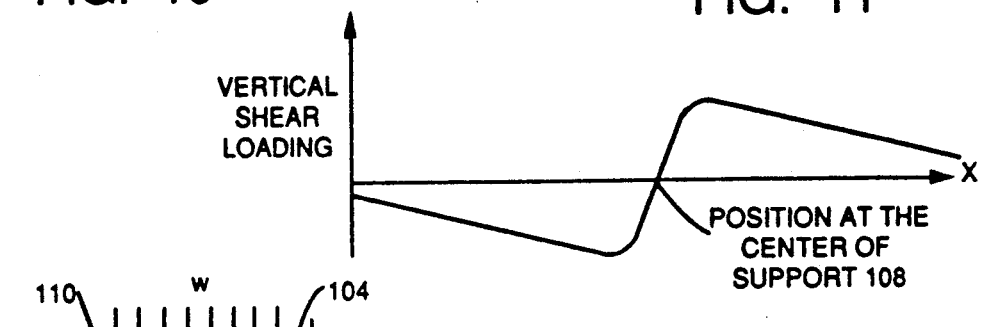
FIG. 13 is a graphic representation of the shear force loads of the section of FIG. 12 as a function of the beam's longitudinal length.

Generally speaking, the meridional stresses are negligible and the hoop stresses are constant. The radial stresses of the cylinder 100 can be determined by modeling the tank 10 as a series of narrow axial elements 110, represented by dashed lines in FIG. 10, disposed around the periphery of the cylinder and joined edge-to-edge and conducting a similar analysis on the axial element as if it is a beam wherein the shear stresses equal the radial stresses of the tank. The radial stresses not only vary along the longitudinal axis, but also vary about the circumference of the tank. The axial elements adjacent supports 106 and 108 have the highest radial stress values and the axial elements positioned 180° therefrom have the least radial stress values. FIG. 13 shows a graphic representation of the shear force loading of the axial element 110 shown in FIG. 12. The total stress at any point along the tank 100 equals the sum of $\sigma_1+\sigma_2+\sigma_3$. Generally, $\sigma_1$ and $\sigma_2$ are constant throughout the entire tank 100. Thus, the density of core 105 is greatest near the areas having the highest total stresses, the end sections which are adjacent to supports 102 and 106, and varies about both the longitudinal axis and the tank circumference. The lowest core density is near the top of the tank 100. This results in a much lighter tank than one having a constant core density.

In the case where the cylindrical pressurized tank 100 has a hemispherical capped end and a plate bolted to a flanged end, stress discontinuities or stress concentrations exist near the junctures of the hemispherical cap and the flange. The discontinuities are manifested by a combination of high stresses $\sigma_1$, $\sigma_2$ and $\sigma_3$ near the juncture as compared to other regions of the tank 100. Therefore, in such a tank the core density should be greatest adjacent to the juncture, and the core density in regions of the tank away from these juncture points can be reduced, resulting in a lighter tank.

Figure 14:
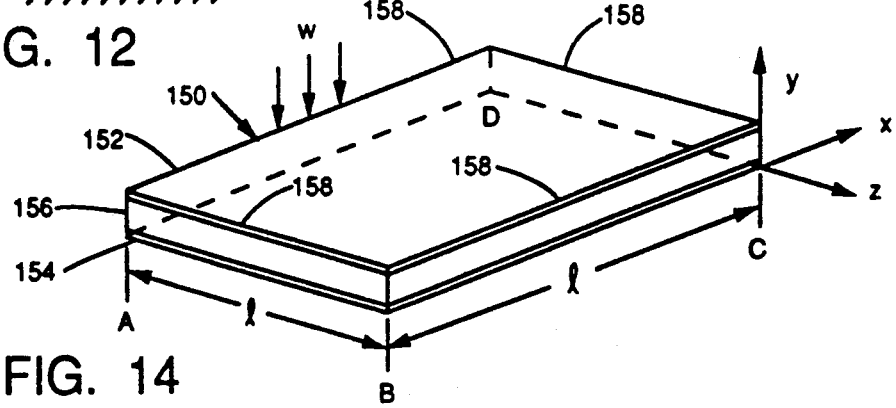
FIG. 14 shows a top view in perspective of a square plate under a uniform pressure load and being simply supported at the plate corners.

A further embodiment of the present invention is a plate or panel 150 as shown in FIG. 14 wherein the length and the width of the plate are substantially greater than the plate thickness. The panel 150 is square and is subjected to a uniform transverse load w about an upper surface thereof. The panel includes an upper face sheet 152 and a lower face sheet 154 mounted to respective faces of a variable core material 156. The panel is simply supported about its corners at A, B, C and D. Since the panel 150 is square and edges 158 have the same length l, the reaction force at each corner A, B, C and $$D = \frac{wl^2}{4}.$$

Figure 15:
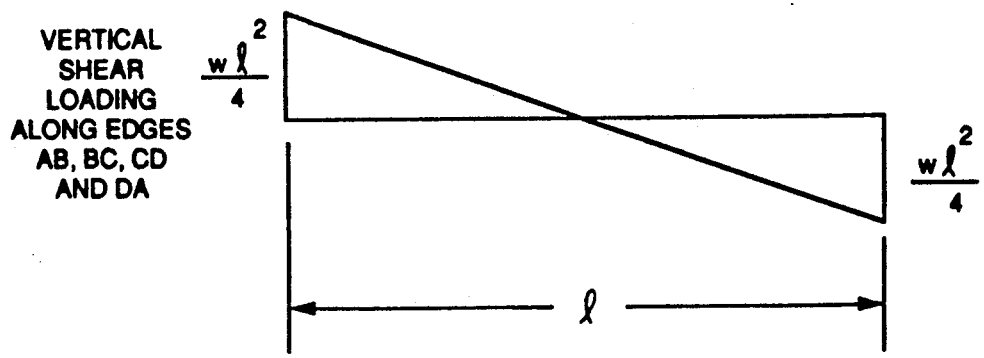
FIG. 15 is a graphic representation of the shear force loading along the edges AB, BC, CD and DA of the plate of FIG. 14.

The panel 150 is subjected to stresses $\sigma_x$, $\sigma_y$, $\sigma_{xy}$, $\sigma_{xz}$ and $\sigma_{yz}$, which can be approximated by various mathematical and computer techniques that are well known in the art. $\sigma_{xz}$ and $\sigma_{yz}$ along the edges are directly related to the shear forces. FIG. 15 shows the approximated shear force along the edges of panel 150. Generally speaking, the $\sigma_x$, $\sigma_y$ and $\sigma_{xy}$ along the edges of panel 150 are substantially less than $\sigma_{xz}$ and $\sigma_{yz}$. Accordingly, the total stresses ($\sigma_x+\sigma_y+\sigma_{xy}+\sigma_{xz}+\sigma_{yz}$) are highest at corners A, B, C and D and there adjacent, and are least at the mid-sections along the edges 158. Accordingly, with respect to the panel edges, the core density is greatest proximate to corners A, B, C and D. The proper core densities can also be determined for the remainder of the plate using the stress analysis techniques as mentioned hereinabove.

As stated previously, urethanes and ceramics of different densities can be used for the core material of the beams. Likewise, varying density urethanes can also be used as the core material for panels or tanks. Varying density urethane cores can be made by injecting different density urethanes onto a mold at various predetermined locations and permitted to cure, producing a variable density structure. Alternatively, cured portions made from different density urethane foam may be glued together and yield a variable density beam, panel or cylinder. Also, a core can be extruded by simultaneously injecting differing densities of urethane foam into preselected locations along a mold length and/or width, the mold length and width corresponding to the length and width of the structural element, and permitting the structural element to cure. The composite elements can be a polymer matrix composite in which the resident matrix material is selected from a group of epoxies, polyimides, polyesters and urethanes, and the fiber components are selected from a group consisting of aramid fibers, glass fibers, carbon fibers and polyester fibers.

Having described the presently preferred embodiments of the invention, it is to be understood that it may otherwise be embodied within the scope of the pending claims.

I claim:

1. A composite element comprising:
    a core having two faces and having a length extending along a longitudinal axis and a thickness extending along a transverse axis perpendicular to the longitudinal axis, said core having a density varying along the core length; and
    two face sheets, each face sheet attached to a respective core face.

2. The composite element of claim 1 wherein the core density at a selected longitudinal position is constant across the core thickness.

3. The composite element of claim 1 wherein said core comprises ceramic material.

4. The composite element of claim 1 wherein said core material comprises a urethane foam.

5. The composite element of claim 1 wherein said face sheets comprise metal.

6. The composite element of claim 1 wherein said face sheets comprise a fiber reinforced polymeric material or a polymer matrix composite material.

7. The composite element of claim 1 wherein said longitudinal axis core length is substantially greater than said core thickness and each of the face sheets having a thickness substantially less than the core thickness.

8. The composite element of claim 1 wherein the core density continuously varies along the core length.

9. The composite element of claim 1 wherein said element is a beam.

10. The composite element of claim 1 wherein said element is a plate.

11. The composite element of claim wherein said element is a shell.

12. A composite element for mounting onto a support structure comprising:
    a core having two faces and having a length extending along a longitudinal axis and a thickness extending along a transverse axis perpendicular to the longitudinal axis, the length being substantially greater than the thickness, said core having a first end section and a second end section positioned along the longitudinal axis for mounting to the support structure, and a middle section positioned between said first end section and said second end section, said core density varying along the core length and having the highest densities at said first end section and said second end section and further having the lowest density at said middle section; and
    two face sheets each face sheet attached to a respective core face.

13. The composite element of claim 12 wherein said core density continuously decreases from said first end section to said middle section and continuously increases from said middle section to said second end section.

14. The composite element of claim 12 wherein said core is a ceramic material.

15. The composite element of claim 12 wherein said core material is a urethane foam.

16. The composite element of claim 12 wherein said face sheets comprise metal.

17. The composite element of claim 12 wherein said face sheets comprise a polymer matrix composite in which resin matrix material is selected from the group consisting of epoxies, polyimides, polyesters and urethanes and the fiber components are selected from the group consisting of aramid fibers, glass fibers, carbon fibers and polyester fibers.

18. The composite element of claim 12 wherein each of said faces comprise a monolithic material.

19. The composite element of claim 12 wherein said element is a shell.

20. The composite element of claim 12 wherein said element is a plate.

21. The composite element of claim 12 wherein said element is a beam.

22. A high temperature composite element for mounting on a support structure having a length extending along a longitudinal axis and a thickness extending along a transverse axis which is perpendicular to the longitudinal axis, the length being substantially greater than the thickness, said element comprising:
    a core material having two faces and a constant thickness, said core material having a density which varies with respect to the longitudinal axis and which is constant with respect to the axial axis; and
    two face sheets where a respective sheet is bonded to a respective core material face, said panel having a first longitudinal end section for mounting on the support structure, a second longitudinal end section for mounting on the support structure and a middle section, one of said faces adapted for being subjected to pressures substantially greater than said other face, said core density being greatest at said end sections and said core density being least at the longitudinal middle section of said core.

23. A composite element for mounting onto a support structure comprising:
    a shell-like core having two faces and having a length extending along a longitudinal axis and a thickness, said core density varying along the circumference of the shell-like core; and
    two face sheets, each face sheet attached to a respective core face.

24. The composite element of claim 23 wherein said core is cylindrically shaped.

25. The shell-like composite element of claim 23 wherein said core density also varies along the core length.

* * * * *